(12) United States Patent
Hofmann

(10) Patent No.: US 12,534,813 B2
(45) Date of Patent: Jan. 27, 2026

(54) PURIFICATION OF METALLIC OBJECTS IN THE PRESENCE OF A LIQUID AND LAYER SILICATE(S)

(71) Applicant: Atotech Deutschland GmbH & Co. KG, Berlin (DE)

(72) Inventor: Udo Hofmann, Berlin (DE)

(73) Assignee: Atotech Deutschland GmbH & Co. KG, Berlin (DE)

( * ) Notice: Subject to any disclaimer, the term of this patent is extended or adjusted under 35 U.S.C. 154(b) by 614 days.

(21) Appl. No.: 17/908,934

(22) PCT Filed: Mar. 3, 2021

(86) PCT No.: PCT/EP2021/055261
§ 371 (c)(1),
(2) Date: Sep. 2, 2022

(87) PCT Pub. No.: WO2021/175891
PCT Pub. Date: Sep. 10, 2021

(65) Prior Publication Data
US 2023/0092003 A1 Mar. 23, 2023

(30) Foreign Application Priority Data
Mar. 5, 2020 (EP) .................................... 20161204

(51) Int. Cl.
*B01J 20/12* (2006.01)
*B08B 3/04* (2006.01)
(Continued)

(52) U.S. Cl.
CPC ................ *C23G 5/00* (2013.01); *B01J 20/12* (2013.01); *C11D 7/20* (2013.01); *C11D 17/0013* (2013.01);
(Continued)

(58) Field of Classification Search
None
See application file for complete search history.

(56) References Cited

U.S. PATENT DOCUMENTS 3,350,243 A 10/1967 Schiffman
3,966,432 A 6/1976 Rayner
(Continued)

FOREIGN PATENT DOCUMENTS

CN 203700531 U 7/2014
CN 105331992 A 2/2016
(Continued)

OTHER PUBLICATIONS

Anderson et al., ASM Handbook, vol. 02A—Aluminum Science and Technology (ASM Int'l 2018), retrieved from https://app.knovel.com/hotlink/pdf/id:kt00CYUHU1/asm-handbook-volume-02a/ (Year: 2018).*

(Continued)

*Primary Examiner* — Kaj K Olsen
*Assistant Examiner* — Richard Z. Zhang
(74) *Attorney, Agent, or Firm* — Renner, Otto, Boisselle & Sklar, LLP

(57) ABSTRACT

This invention is related to a process for purification of metallic objects comprising an oil-adsorbing step in the presence of
a liquid and
a layer silicate component.

14 Claims, 2 Drawing Sheets

(51) Int. Cl.
*C11D 7/20* (2006.01)
*C11D 17/00* (2006.01)
*C23G 1/02* (2006.01)
*C23G 1/14* (2006.01)
*C23G 1/24* (2006.01)
*C23G 5/00* (2006.01)

(52) U.S. Cl.
CPC .............. *B08B 3/04* (2013.01); *C11D 2111/16* (2024.01); *C23G 1/02* (2013.01); *C23G 1/14* (2013.01); *C23G 1/24* (2013.01)

(56) References Cited

U.S. PATENT DOCUMENTS

| | | | |
|---|---|---|---|
| 9,782,804 B1 | 10/2017 | Hatle et al. | |
| 2002/0108640 A1* | 8/2002 | Barger | C11D 3/3776 134/34 |
| 2003/0119689 A1 | 6/2003 | Hutton et al. | |

FOREIGN PATENT DOCUMENTS

| | | |
|---|---|---|
| CN | 107059028 A | 8/2017 |
| CN | 110270797 A | 9/2019 |
| DE | 2022763 A1 | 11/1971 |
| DE | 2507059 A1 | 9/1976 |
| EP | 0117599 A1 | 9/1984 |
| GB | 1349433 | 4/1974 |
| JP | S62297209 A | 12/1987 |
| JP | H10130691 A | 5/1998 |
| JP | 2001129499 A | 5/2001 |
| JP | 2006150336 A | 6/2006 |
| JP | 2007204284 A | 8/2007 |
| JP | 2008050520 A | 3/2008 |
| JP | 2015110760 A | 6/2015 |
| KR | 20190072768 A | 6/2019 |
| WO | 9627654 A1 | 9/1996 |
| WO | 2011020540 A1 | 2/2011 |
| WO | 2017197665 A1 | 11/2017 |
| WO | 2019113040 A1 | 6/2019 |

OTHER PUBLICATIONS

PCT/EP2021/055261; International Search Report and Written Opinion of the International Searching Authority dated Apr. 30, 2021.

* cited by examiner ial phase of International Application No. PCT/EP2021/055261, filed 3 Mar. 2021, which claims priority to European Patent Application No. 20161204.1, filed 5 Mar. 2020, each of which is hereby incorporated herein by reference in its entirety.

PURIFICATION OF METALLIC OBJECTS IN THE PRESENCE OF A LIQUID AND LAYER SILICATE(S)

This application is a national phase of International Application No. PCT/EP2021/055261, filed 3 Mar. 2021, which claims priority to European Patent Application No. 20161204.1, filed 5 Mar. 2020, each of which is hereby incorporated herein by reference in its entirety.

FIELD OF THE INVENTION

This invention is related to a process for purification of metallic objects comprising an oil-adsorbing step in the presence of
a liquid and
a layer silicate component.

BACKGROUND OF THE INVENTION

After the production of metallic objects like e.g. screws, nuts or bolts, these metallic objects comprise impurities. Typical impurities are oxidic layers, like rust or scale, and oils/grease on the surface of the metallic objects. Without removal of the impurities the metallic objects have substandard functionality. In order to improve properties such as performance and corrosion inhibition, further work-up steps like e.g. further metallization or coating of the metallic objects are required. However, to achieve best results the impurities must be removed from the metallic objects before such work-up.

In the literature, methods for removal of said impurities are described.

The removal of oils, fats, grease and the like are often designated as degreasing. Sometimes the term de-oiling is used instead.

Metallic oxides like rust or scale can be removed by chemically or mechanical methods. Chemical treatment which is typically performed by acids like hydrochloric acid or sulfuric acid, is designated as pickling. Mechanical removal is typically performed by abrasive methods like sand blasting, shot blasting or wet blasting.

The steps of degreasing and pickling can be performed simultaneously or subsequently.

DE2507059 describes a process for one-bath degreasing and pickling of metal articles, consisting of or containing iron, by treating them with aqueous solutions containing water-soluble aromatic nitro compounds as oxidising agents, in addition to acids, wetting agents and/or emulsifiers. The process is used for cleaning surfaces, e.g. of screws and sheet materials, from oils, fats, resins and coked residues. Surfaces can be further processed directly, e.g. by electroplating.

The utility model CN203700531U discloses a derusting and cleaning system for screws/nuts. The system consists of different devices like a pickling de-rusting device and an alkali washing degreasing device. The focus lies on the neutralization of waste streams.

CN110270797 discloses a method for processing a spring compressor. The method comprises the steps of producing a screw, followed by steps of cleaning, degreasing, pickling and blackening.

KR20190072768 discloses a method for removing scale and improving surface cleanness of a screw portion of a fastener for a vehicle such as a bolt, a screw, and a nut, comprising; a surface cleaning step by immersion for 5-15 minutes in a fastener degreasing liquid maintained at 15-25 concentration points (ppm) of alkali and at 60-80 degrees centigrade of temperature to improve surface cleanliness by rapidly removing organic; and inorganic matters and a vinylidene chloride resins coating attached on the surface; a first pickling step by immersion in a scale pickling solution for 30-180 seconds such that the scale and bur of the fastener for a vehicle may be firstly dissolved through a negative electrode reaction producing a first Fe ion (Fe2+) and water; and a second pickling step.

WO2011020540 discloses a method for cleaning/descaling a metallic strip in which first water and then a cryogen, e.g. liquid nitrogen, are applied.

In addition, the prior art discloses a number of methods which comprise compositions with clay as one of several components and/or a number of process steps.

In the experimental section, WO2017197665 discloses a degreasing anti-corrosion anti-rust agent which comprises sodium hydroxide, sodium chlorate, triethylenetriamine, hydrochloric acid, phosphoric acid and a minor amount of unspecified clay. CN105331992 discloses an aluminum surface degreasing agent which comprises not less than sixteen components such as cerium nitrate, polyvinyl alcohol, molybdenum disulfide and a minor amount of unspecified clay. DE2022763 discloses a method for purification of mixed waste streams comprising organic solvents or alkaline emulsifiers by means of unspecified clay (<20 µm) and an inorganic salt.

US 2003/0119689 A1 refers to a hard-surface cleaning, optionally silicate-containing composition for removing cooked-, baked-, or burnt-on food soil from cookware and tableware, the composition comprising a smectite-type clay thickening agent and a hydrophobically modified polyacrylate polymer.

U.S. Pat. No. 3,966,432 relates to abrasive compositions in liquid form for cleaning hard surfaces, for domestic or industrial use.

U.S. Pat. No. 9,782,804 B1 refers to a method for passivating substrate surfaces by removing surface contaminants.

DE 0 117 599 A1 refers to a method for pre-treating of metal surfaces, including a pre-treatment bath comprising bentonite.

JP 2015 110760 A refers to a composition for washing and cleaning, containing a fulvic-acid containing humic substance and clay.

CN 107059028 B refers to an aluminum alloy cleaning agent with corrosion inhibiting effect.

JPH 10130691 A refers to a detergent composition.

The use of abrasives in order to shape or finish workpieces is known. Exemplarily, Wiener Kalk (Vienna lime) shall be mentioned as powder abrasive, i.e. an abrasive without further cleaning agents. Vienna lime comprises pulverized dolomite, i.e. a calcium magnesium carbonate rock, $CaMg(CO_3)_2$. The workpieces are rubbed with Vienna lime and rust/scale are removed. Unlike, e.g. layered silicates, Vienna lime is a solid material which comprises inner structures only to a small extent. its ability to adsorb e.g. organic molecules is rather limited. Hence, the treatment is mainly based on mechanical abrasion.

Bentonite is known for its adsorptive properties. Consequently, bentonite is used in the winemaking process to remove excessive amounts of protein from white wines. In addition, bentonite is used in a variety of pet care items such as cat litter to absorb the odor and surround the feces. It is also used to absorb oils and grease.

OBJECTIVE OF THE PRESENT INVENTION

It is an objective of the present invention to provide a process in order to degrease metallic objects.

It is a further objective of the present invention to provide a process in order to remove oxidic layers from the metallic objects.

It is yet a further objective to provide a process which reduces the amount of waste water.

It is yet a further objective to provide a process with a limited number of process steps.

It is yet a further objective to minimize the interruption/physical separation of steps in order to avoid any unnecessary oxidation.

SUMMARY OF THE INVENTION

Above-named objectives are solved by providing a process for purification of metallic objects comprising an oil-adsorbing step in the presence of
a liquid and
a layer silicate component.

Above-named objectives are further solved by providing a process for purification of metallic objects further comprising an abrasive step,
whereas both steps are performed separately or simultaneously, preferred simultaneously; preferably
further comprising an abrasive step utilizing an abrasive material,
whereas both steps are performed separately or simultaneously, preferred simultaneously.

DETAILED DESCRIPTION OF THE INVENTION

Purification:

Purification in its broadest sense within the frame of the present invention describes the removal of one or more of
oxidic layer(s) like rust or scale and/or
oil(s)
from the surface of the metallic objects.

The removal can be partial or complete.

The impurities are a result of the respective production processes. Without removal of the impurities the metallic objects have substandard functionality. In order to improve properties such as performance and corrosion inhibition, further work-up steps like e.g. further metallization or coating of the metallic objects are required. However, to achieve best results the impurities must be removed from the metallic objects before such work-up.

Removal of Rust/Scale:

According to the state of the art, metallic oxides like rust or scale can be removed by chemically or mechanical methods. Chemical treatment which is typically performed by acids like hydrochloric acid or sulfuric acid, is designated as pickling. Mechanical removal is typically performed by abrasive methods like sand blasting, shot blasting or wet blasting.

Removal of Oil(s):

The term 'oil' as used herein includes fatty oil, fat, synthetic oil, mineral oil, silicon oil, semi synthetic oil, substituted oil, grease or mixtures thereof.

The term 'fatty oil' typically refers to a lipid with short and/or unsaturated fatty acid chains that is liquid at room temperature, while 'fat' specifically refers to a lipid that is solid at room temperature.

The term 'synthetic oil' describes a lubricant consisting of chemical compounds that are artificially made, Synthetic lubricants can be manufactured using chemically modified petroleum components rather than whole crude oil, but can also be synthesized from other raw materials. The base material, however, is still overwhelmingly crude oil that is distilled and then modified physically and chemically.

The term 'mineral oil' describes any of various colorless, odorless, light mixtures of higher alkanes from a mineral source, particularly a distillate of petroleum.

The term 'silicon oil' describes any liquid polymerized siloxane with organic side chains.

The term 'semi synthetic oil' describes a mixture of mineral oil and synthetic oil, The term 'substituted oil' describes an oil which comprises atoms other than carbon, oxygen and/or hydrogen such as e.g. chlorinated oil.

The term 'grease' typically refers to a solid or semisolid lubricant which generally comprises a thickening soap mixed, e.g. emulsified, with an oil.

Metallic Objects:

Metallic objects are made of metal, i.e. the metallic objects consist mainly, i.e. larger than 80 weight %, preferred more than 90 weight % of metal.

The metal is preferably selected from iron, copper, zinc, titanium, nickel, aluminum, magnesium and respective mixtures/alloys such as steel, in particular stainless steel, brass, bronze and monel.

The size of the metallic objects is of from 0.005 m to 2 m, preferred of from 0.01 m to 1 m, more preferred of from 0.02 m to 0.5 m, even more preferred of from 0.05 m to 0.25 m, particularly preferred of from 0.05 m to 0.20 m.

The size is hereby defined as the average length of the largest dimension of a defined number of metallic objects.

Preferred metallic objects are fasteners such as screws, bolts, nuts and nails. More preferred are screws or nuts.

Oil-Absorbing Step:

The oil-adsorbing step is performed as a step wherein the oil of the metallic objects is removed by means of adsorption of the oil on a solid substance which is not soluble in the liquid. Thus, the layer silicate component is preferably solid.

Preferred the liquid comprises water. More preferred the liquid comprises water in an amount of at least 50 wt % (weight water:weight of total liquid), even more preferred the liquid comprises water in an amount of at least 80 wt %, even more preferred the liquid comprises water in an amount of at least 90 wt %, even more preferred the liquid comprises water in an amount of at least 95 wt %. Most preferred the liquid consists of water.

Preferably, water is the only solvent in the entire oil-adsorbing step.

According to the invention, the solid oil-adsorbing substance is a layer silicate component. Thus, the oil-adsorbing step preferably utilizes a dispersion for the purification of the metallic objects, comprising said liquid and said silicate component.

Layer Silicate Component:

Layer silicates, alternative terms are sheet silicates or phyllosilicates, are silicates that are formed by parallel sheets of silicate tetrahedra with $Si_2O_5$.

Examples are Serpentine subgroup, e.g. Antigorite—$Mg_3Si_2O_5(OH)_4$, Chrysotile—$Mg_3Si_2O_5(OH)_4$, Lizardite—$Mg_3SiO_2O_5(OH)_4$; Clay minerals group, e.g. Halloysite—$Al_2Si_2O_5(OH)_4$, Kaolinite—$Al_2Si_2O_5(OH)_4$, Illite—$(K,H_3O)(Al,Mg,Fe)_2(Si,Al)_4O_{10}[(OH)_2,(H_2O)]$, Montmorillonite—$(Na,Ca)_{0.33}(Al,Mg)_2Si_4O_{10}(OH)_2 \cdot nH_2O$, Vermiculite—$(MgFe,Al)_3(Al,Si)_4O_{10}(OH)_2 \cdot 4H_2O$, Talc—$Mg_3Si_4O_{10}(OH)_2$, Sepiolite—$Mg_4Si_6O_{15}(OH)_2 \cdot 6H_2O$, Palygorskite (or attapulgite)—$(Mg,Al)_2Si_4O_{10}(OH) \cdot 4(H_2O)$, Pyrophyllite—$Al_2Si_4O_{10}(OH)_2$; Mica group, e.g. Biotite—$K(Mg,Fe)_3(AlSi_3)O_{10}(OH)_2$, Fuchsite—$K(Al,Cr)_2(AlSi_3O_{10})(OH)_2$, Muscovite—$KAl_2(AlSi_3)O_{10}(OH)_2$, Phlogopite—$KMg_3(AlSi_3)O_{10}(OH)_2$, Lepidolite—$K(Li,Al)_{2-3}(AlSi_3)O_{10}(OH)_2$, Margarite—$CaAl_2(Al_2Si_2)O_{10}(OH)_2$, Glauconite—$(K,Na)(Al,Mg,Fe)_2(Si,Al)_4O_{10}(OH)_2$; Chlorite group, e.g. Chlorite—$(Mg,Fe)_3(Si,Al)_4O_{10}(OH)_2\cdot(Mg,Fe)_3(OH)_6$.

Preferred layer silicates are those of the Clay minerals group, e.g. Halloysite—$Al_2Si_2O_5(OH)_4$, Kaolinite—$Al_2Si_2O_5(OH)_4$, Illite—$(K,H_3O)(Al,Mg,Fe)_2(Si,Al)_4O_{10}[(OH)_2,(H_2O)]$, Montmorillonite—$(Na,Ca)_{0.33}(Al,Mg)_2Si_4O_{10}(OH)_2\cdot nH_2O$, Vermiculite—$(MgFe,Al)_3(Al,Si)_4O_{10}(OH)_2\cdot 4H_2O$, Talc—$Mg_3Si_4O_{10}(OH)_2$, Sepiolite—$Mg_4Si_6O_{15}(OH)_2\cdot 6H_2O$, Palygorskite (or attapulgite)—$(Mg,Al)_2Si_4O_{10}(OH)\cdot 4(H_2O)$, Pyrophyllite—$Al_2Si_4O_{10}(OH)_2$.

Preferably, in the process of the present invention, the layer silicate component comprises montmorillonite.

More preferred is a process of the present invention, wherein the layer silicate component comprises silicon dioxide and aluminum dioxide, wherein preferably in the layer silicate component the silicon dioxide and the aluminum dioxide amount together to 85 wt.-% or more, based on the total weight of the layer silicate component, preferably 87 wt.-% or more, more preferably 89 wt.-% or more, even more preferably 91 wt.-% or more, most preferably 93 wt.-% or more.

Clay minerals can be classified as 1:1 or 2:1, this originates because they are fundamentally built of tetrahedral silicate sheets and octahedral hydroxide sheets. A 1:1 day would consist of one tetrahedral sheet and one octahedral sheet, and examples would be kaolinite and serpentine. A 2:1 clay consists of an octahedral sheet sandwiched between two tetrahedral sheets, and examples are talc, vermiculite and montmorillonite.

Clay minerals include the following groups:
  Kaolin group which includes the minerals kaolinite, dickite, halloysite, and nacrite (polymorphs of $Al_2Si_2O_5(OH)_4$).
    Some sources include the kaolinite-serpentine group due to structural similarities
  Smectite group which includes dioctahedral smectites such as montmorillonite, nontronite and beidellite and trioctahedral smectites for example saponite.
  Illite group which includes the clay-micas. Illite is the only common mineral.
  Chlorite group includes a wide variety of similar minerals with considerable chemical variation
  Other 2:1 clay types exist such as sepiolite or attapulgite, clays with long water channels internal to their structure.

Particularly preferred are montmorillonite and its mixtures with other layer silicates such as bentonite, which is a natural occurring phyllosilicate. In addition to montmorillonite, bentonite can also comprise quartz, mica, feldspar, pyrite, calcite, Illite and/or kaolinite.

Bentonite is preferably selected from sodium bentonite, calcium bentonite, potassium bentonite or a mixture of two or more of these.

The different soils can also be categorized with regard to particle size:

Clay has a particle size of less than 2 micrometers, silt has a particle size of more than 2 micrometers but less than 63 micrometers; sand has a particle size of more than 63 micrometers.

Mixtures of these species are known, e.g. loam. Depending on the composition, these are e.g. designated as clay loam, sandy loam, sandy clay loam, silt loam, silty clay loam.

Amounts and Ratios:

Typical amounts of metallic objects are from 4 kg to 400 kg, preferred 20 kg to 150 kg.

Typical amounts of liquid are from 100 kg to 5 000 kg, preferred 150 kg to 2 000 kg.

Typically, the amount of metallic objects and the amount of liquid are within a certain ratio.

Preferred ratios (metallic objects):(liquid) are of from 0.005:1 (by weight) to 0.1:1 (by weight), more preferred of from 0.01:1 (by weight) to 0.06:1 (by weight).

The amount of the layer silicate component depends on the amount of metallic objects to be purified. If too few layer silicate component is applied then its oil adsorption capacity is reached too soon.

In addition, the amount of the layer silicate component further depends on the amount of liquid. If too much layer silicate component is applied then handling problems might occur.

As a consequence, preferred amounts of layer silicate component are from 5 kg to 1 500 kg, more preferred 100 kg to 400 kg.

Preferred ratios (layer silicate component):(metallic objects) are of from 0.05:1 (by weight) to 5:1 (by weight), more preferred of from 0.2:1 (by weight) to 1:1 (by weight).

Preferred ratios (layer silicate component):(liquid) are of from 0.05:1 (by weight) to 0.6:1 (by weight), more preferred of from 0.1:1 (by weight) to 0.4:1 (by weight).

Very preferred is a process of the present invention, wherein
  the layer silicate component has a total amount ranging from 10 wt.-% to 40 wt.-%, based on the combined total weight of the liquid, the layer silicate component, and the abrasive material, preferably ranging from 14 wt.-% to 35 wt.-%, more preferably ranging from 18 wt.-% to 31 wt.-%, even more preferably ranging from 21 wt.-% to 28 Wt.-%, most preferably ranging from 23 wt.-% to 26 wt.-%;
  and/or
  the abrasive material has a total amount ranging from 0.5 wt.-% to 15 wt.-%, based on the combined total weight of the liquid, the layer silicate component, and the abrasive material, preferably ranging from 1 wt.-% to 12 wt.-%, more preferably ranging from 2 wt.-% to 10 wt.-%, even more preferably ranging from 3 wt.-% to 8 Wt.-%, most preferably ranging from 4 wt.-% to 6 wt.-%.

The adsorption of oil at the layer silicate component reduces the formation of a lipophilic liquid phase, even without surfactant. Therefore, the prior art process of micellisation/emulsion forming by means of tensides can be completely substituted by the process of the instant invention. Nevertheless, tensides might be used in the inventive process in order to facilitate the purification of the metallic objects. However, since the presence of tensides leads to problems like e.g. water pollution, preferred, the inventive process is performed in the absence of surfactants.

In a preferred embodiment, the process is performed in an ultrasound field.

In a preferred embodiment, the oil-adsorbing step is performed in a non-abrasive manner. The term 'non-abrasive' means that the metallic objects are contacted with the layer silicate component in such a way that abrasion of the surface of the metallic objects only occurs to a minor extent, if at all.

The adsorption process can be influenced by several parameters.

In principle, the process can be performed at a variety of pH values. However, it has been found that the process works best in the absence of strong acids or bases. Preferred, the process is performed at a pH of from 4 to 10.6, more preferred the process is performed at a pH of from 5 to 9.

Similarly, the process can be performed at a variety of temperatures. Preferably, the process is performed at a temperature of from 10° C. to 50° C., preferred of from 20° C. to 40° C.

The process can be supported by agitating the mixture of metallic objects, liquid and layer silicate component. This can be achieved by bubbling air through the mixture or by suitable mechanical mixing or by circulation pumps.

Preferred, the inventive process is performed in soak or barrel equipment, rotary drum washing equipment, sprinkler equipment and/or spray equipment.

The removal of oil(s) from the metallic objects can be tested as follows:
- cleaned metallic object is dipped into a slightly acidic copper sulfate solution and the regularity/homogeneity of the copper immersion deposit is determined (copper sulfate test);
- the surface tension is measured by means of test pens as e.g. commercially available from the company Dyne (http://www.dynetechnology.co.uk/measurement-equipment/dyne-test-pens/)
- Surface fluorescence test: a test method making use of fluorescence (https://www.sita-process.com/products/fluorescence-measuring-and-testing-devices/sita-cleanospector/)

Preferred is the copper sulfate test. A sample passes the test if the copper layer is visually dense. That means in particular that no defects can be determined that are larger than $0.1\ mm^2$.

When the process is performed for the first-time metallic objects are regularly taken from the process and tested. This allows to determine the time that is required until the metallic objects are sufficiently free of oil(s) to meet the required specification for any treatment selected but not limited from plating, postprocessing or any other application.

Typical times are within the range of from 5 minutes to 60 minutes, preferred within the range of from 10 minutes to 20 minutes.

Process further comprising an abrasive step:

In a preferred embodiment of the invention, the process further comprises an abrasive step, whereas both steps are performed separately or simultaneously, preferred simultaneously. In the abrasive step an abrasive material is utilized. 'Simultaneously' particularly means that both steps take place in the same apparatus, but not necessarily at the same location of said apparatus, In the abrasive step the metallic objects are contacted with an abrasive material, preferably provided in a slurry.

In principle, the abrasive material can be any material that exhibits sufficient hardness in order to remove scale. Known abrasive materials are e.g. silicon carbide, silicon oxide, tungsten carbide, garnet, corundum ($\alpha$-$Al_2O_3$, a crystalline phase of aluminum oxide), quartz and quartz sand. More preferred is a process of the present invention, wherein the abrasive material comprises aluminium oxide, most preferably corundum.

Even more preferred is a process of the present invention, wherein the layer silicate component and the abrasive material comprise aluminium oxide.

Preferred are those abrasive materials that remove scale but at the same time have no or only a small impact, i.e. no or small notching effect, on the metal of the metallic objects itself. Hence, preferred abrasive materials are selected from the group consisting of glass, garnet and steel, particularly preferred stainless steel, and mixtures thereof, preferably applied as small beads ("shot bees").

Preferably, the abrasive material comprises at least particles with a particle size of less than 500 micrometers, preferably of less than 300 μm, more preferably of less than 150 μm, most preferably of less than 100 μm. More preferably, the abrasive material comprises at least particles with a particle size ranging from 10 μm to 100 μm, preferably from 25 μm to 90 μm, most preferably from 40 μm to 80 μm. Most preferably, more than 50 wt.-% of the total amount of abrasive material utilized in the abrasive step comprises particles with a particle size ranging from 10 μm to 100 μm, preferably from 25 μm to 90 μm, most preferably from 40 μm to 80 μm.

If shot blasting is chosen as method in the abrasive step the gas flow rate is preferably in the range of from 300 L/min to 1 000 L/min.

If wet blasting is chosen as method in the abrasive step the flow rate of the respective slurry is preferably in the range of from 500 Uh to 10 000 L/h.

The abrasive step is preferably performed in the presence of a liquid, preferably at least partly in the presence of the liquid utilized in the oil-adsorbing step. This most preferably provides said slurry.

The use of a liquid in an abrasive step has several advantages such as the reduction of dust and/or the milder treatment of the metallic objects.

It is particularly preferred that the supernatant liquid of the oil-adsorbing step is partially transferred to the abrasive step. This preferably means that at least a part of the liquid utilized in the oil-adsorbing step is transferred to (i.e. also utilized in) the abrasive step.

The advantage of such transfer is that the use of e.g. fresh water can be avoided which renders this process environmentally and economically even more benign.

Oil-adsorbing step and abrasive step are performed separately:

If the oil-adsorbing step and the abrasive step are performed separately then the removal of scale in the abrasive step from the metallic objects must be tested. This can be done by the same methods as described above. Preferred is the copper sulfate test.

When the process is performed for the first time metallic objects are regularly taken from the process and tested. This allows to determine the time that is required until the metallic objects are sufficiently free of scale to meet the required specification for any treatment selected but not limited from plating, postprocessing or any other application.

Typical times are within the range of from 0.5 minute to 15 minutes, preferred within the range of from 5 minutes to 10 minutes.

Oil-adsorbing step and abrasive step are performed simultaneously:

If the oil-adsorbing step and the abrasive step are performed simultaneously the oil-adsorbing step is time-limiting.

Hence, for the simultaneous process, typical times are within the range of from 5 minutes to 60 minutes, preferred within the range of from 10 minutes to 20 minutes.

Removal after purification (with or without abrasive step):

After sufficient purification the purified metallic objects are removed.

In a further embodiment of the invention, the process comprises one or more subsequent washing step(s).

In a more preferred embodiment, the slurry is at least partially transferred to the oil-adsorbing step.

Most preferably, the present invention refers to a process for purification of metallic objects comprising an oil-adsorbing step in the presence of
a liquid and
a layer silicate component,
wherein
the process is performed in the absence of surfactants, and
the layer silicate component and the liquid have a ratio of from 0.05:1 to 0.6:1, each based on weight.

Generally, but particularly in this preferred process of the present invention it is important that the layer silicate component is present in a total amount sufficient to perform as oil-adsorbing component to a significant extent. Thus, the layer silicate component is present in an amount to significantly provide a sufficient capacity for oil-intake. In other words, the amount of the layer silicate component is typically exceeding merely small amounts, which are often used for modifying rheology characteristics. This also means that in the context of the present invention, the layer silicate component is present in such an amount that it can reasonably perform as an oil-adsorbent in the oil-adsorbing step. This furthermore leads to the advantages effect that in the process of the present invention, an utilization of a surfactant can preferably be omitted. Since the oil-adsorbing capacity is sufficiently high, oil, grease, etc. coming from the metallic objects is efficiently adsorbed on the layer silicate component, typically without help of any surfactants. It remains on the layer silicate component without any further need to solubilize it with a surfactant. This has a great impact on the recycling/disposal of the layer silicate component after use. Since the oil (and oil-like substances) is completely adsorbed on the layer silicate component, it can be easily separated from the liquid. Said liquid is most preferably re-used or disposed. Since it is free of surfactants no expensive or sophisticated wastewater treatment is needed. The oil-containing layer silicate component is very compact but still containing high amounts of oil. This provides a huge advantage in terms of storage capacity compared to surfactant-containing liquids comprising comparable amounts of oil.

EXAMPLE

Example 1: Oil Adsorption Capacity

Figure 1:
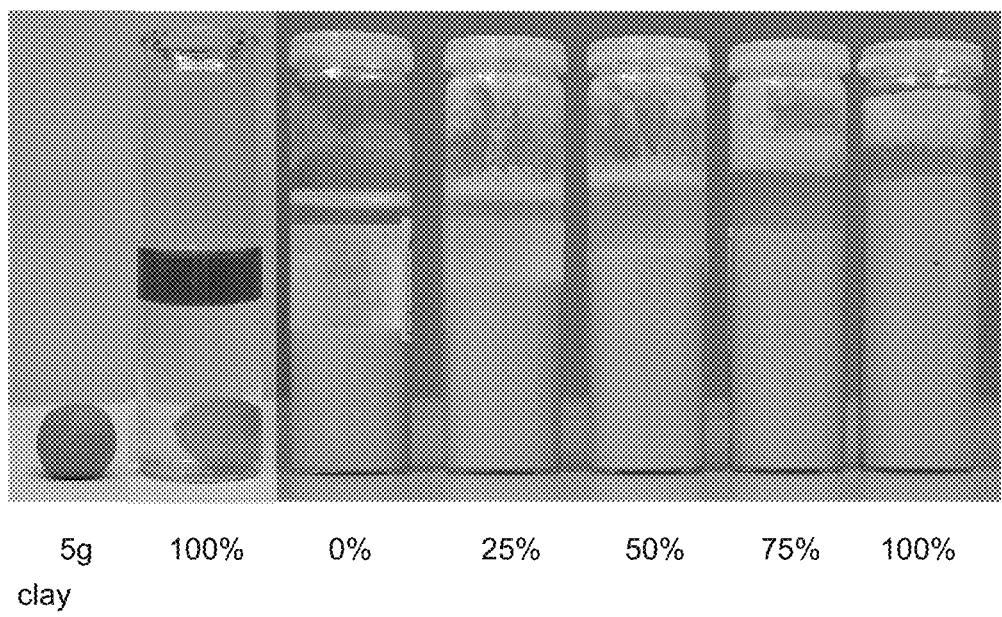
FIG. 1 demonstrates the effect as described in Example 1
Figure 2:
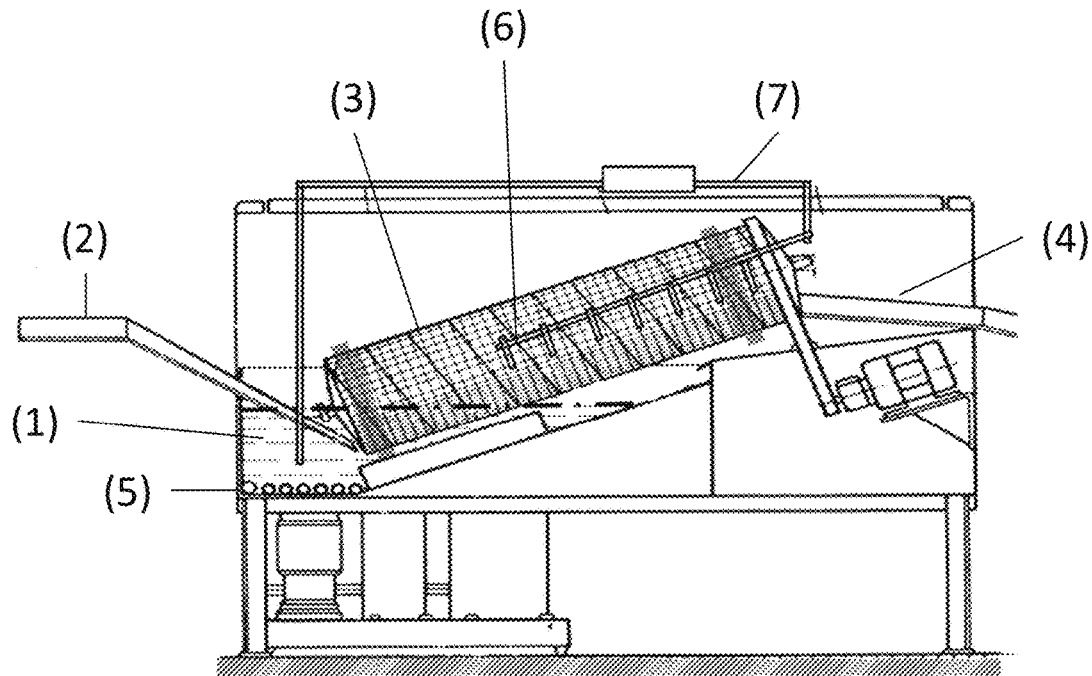
FIG. 2 shows an example for an embodiment of the inventive process
(1): mixture of liquid/layer silicate component
(2): loading (for metallic objects)
(3): Rotary drum washing equipment
(4): removal (of metallic objects)
(5): agitation (here: air bubbling)
(6): sprayer (for abrasive step)
(7): transfer line for mixture of liquid/layer silicate component to sprayer (6)
Figure 3:
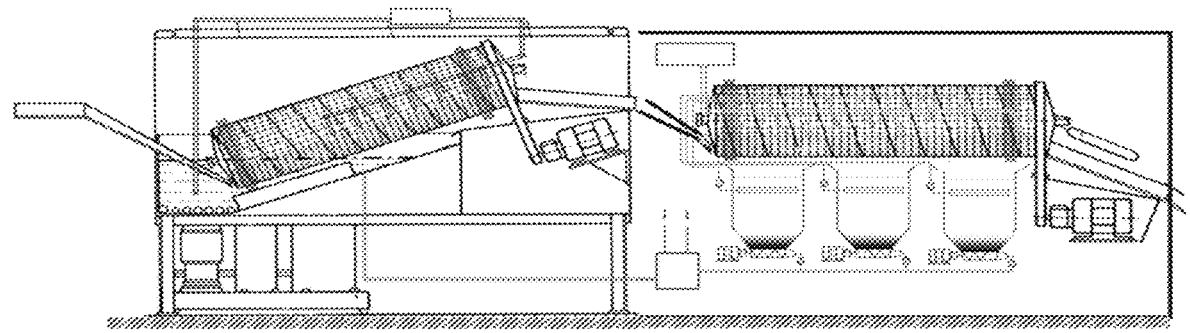
FIG. 3 shows an example for the embodiment of the inventive process according to FIG. 1 with subsequent washing steps

According to the following table, mixtures of 5 g clay (W05-25 Sibelco), 20 g water and different amounts of oil (15W-40 motor oil) were prepared (samples 1a to 1e). The lid was closed and then the mixture was thoroughly shaken manually for 10 minutes. The mixture was allowed to settle. Pictures were taken. These can be found in FIG. 1. In all cases only one liquid phase was yielded.

| Sample | Clay | Water | Oil | Relative amount of oil:clay | Number of liquid phases |
|---|---|---|---|---|---|
| 1a | 5 g | 20 g | 0 g | 0% | 1 |
| 1b | 5 g | 20 g | 1.25 g | 25% | 1 |
| 1c | 5 g | 20 g | 2.50 g | 50% | 1 |
| 1d | 5 g | 20 g | 3.75 g | 75% | 1 |
| 1e | 5 g | 20 g | 5.00 g | 100% | 1 |

The invention claimed is:

1. Process for purification of metallic objects, comprising an oil-adsorbing step in which a composition containing:
a liquid and
a layer silicate component are applied to the metallic objects,
wherein
the process is performed in the absence of surfactants in the composition, and
the layer silicate component and the liquid have a ratio of from 0.05:1 to 0.6:1, based on weight, and the composition has a pH of from 4 to 10.6, the process is performed at a temperature of from 10° C. to 50° C., or both the composition has a pH of from 4 to 10.6 and the process is performed at a temperature of from 10° C. to 50° C.

2. Process according to claim 1 wherein the liquid comprises water.

3. Process according to claim 1 wherein the layer silicate component comprises montmorillonite.

4. Process according to claim 1 wherein the process is performed in soak or barrel equipment, rotary drum washing equipment, sprinkler equipment and/or spray equipment.

5. Process according to claim 1 wherein the process comprises one or more washing steps after the oil-adsorbing step.

6. Process according to claim 5 wherein a slurry is at least partially transferred to the oil-adsorbing step.

7. Process according to claim 1, wherein the layer silicate component comprises silicon dioxide and aluminum dioxide, wherein in the layer silicate component the silicon dioxide and the aluminum dioxide amount together to 85 wt.-% or more, based on a total weight of the layer silicate component.

8. Process according to claim 1 further comprising an abrasive step of applying an abrasive material to the metallic objects, wherein both steps are performed simultaneously.

9. Process according to claim 8, wherein the abrasive material comprises aluminum oxide.

10. Process according to claim 8, wherein the layer silicate component comprises aluminum dioxide.

11. Process according to claim 8, wherein
(1)—the layer silicate component has a total amount ranging from 10 wt.-% to 40 wt.-%, based on a combined total weight of the liquid, the layer silicate component, and the abrasive material, or
(2)—the abrasive material has a total amount ranging from 0.5 wt.-% to 15 wt.-%, based on the combined total weight of the liquid, the layer silicate component, and the abrasive material,
or both (1) and (2).

12. Process according to claim 8, wherein the abrasive material is provided in a slurry.

13. Process according to claim 12, wherein the slurry comprises at least partly the liquid utilized in the oil-adsorbing step.

14. Process according to claim 1 wherein the metallic objects have an oxidic material thereon.

\* \* \* \* \*